2,769,797
Patented Nov. 6, 1956

2,769,797

MELAMINE RESINS MODIFIED WITH POLY-ALKYLENE POLYAMINE-HALOHYDRIN CONDENSATES

Tzeng Jiueq Suen, New Canaan, and Yun Jen, Stamford, Conn., assignors to American Cyanamid Company, New York, N. Y., a corporation of Maine No Drawing. Application July 6, 1955,
Serial No. 520,359

12 Claims. (Cl. 260—45.2)

This invention relates to resinous compositions and to the process for preparing the same. More particularly, this invention relates to the production of resinous compositions which comprise reacting melamine, formaldehyde and a polyfunctional aliphatic polyamine condensation product.

Melamine-formaldehyde resinous compositions are well known in the art. Resinous compositions comprising solely melamine and formaldehyde, as well as those compositions containing melamine, formaldehyde and a modifying component, find many uses. The use of melamine resins in making wet strength paper has been known for a number of years. One of the usual practices when utilizing these resins as wet strength promoters is to dissolve the melamine-formaldehyde resin in a dilute hydrochloric acid solution and age it for a certain length of time. During this period, the resin is further polymerized; and the so-called acid colloid is formed. The acid colloid is infinitely water-soluble and is a very effective beater additive for paper. However, it is not stable and must be prepared by this aging process just prior to use. Besides the acid colloids, other forms of water-soluble melamine resins are known; for instance, methylated polymethylol melamine and bisulfite modified melamine-formaldehyde resin. The methylated product is non-ionic, has a low degree of polymerization and is not generally effective as a beater additive, although it finds other uses in such applications, as in textile treatment and laminating processes. The anionic bisulfite modified product, while far inferior to the acid colloid, does find some use in making wet strength paper.

In our parent application Serial No. 343,792, filed March 20, 1953, it was disclosed that stable, cationic, water-soluble but highly polymerized products are obtainable by reacting melamine, formaldehyde and a water-soluble polyfunctional aliphatic polyamine condensation product in the presence of an acid. These products can be added directly to the pulp stock as an efficient wet strengthening agent for paper through beater addition. The resinous composition prepared can also be used in textile treatment and in leather treatment. Other possible uses are in water-soluble adhesives and as an insoluble agent to starch.

In our parent application it was stated that in the preparation of the resinous material, the order of addition of reactants is not important. For instance, melamine and formaldehyde may be condensed first at a near neutral or slightly alkaline pH. Thereafter, the modifier may be added and the mixture subsequently acidified to expedite polymerization which is found to proceed more rapidly in an acid medium. As soon as the desired degree of polymerization is reached, the polymerization reaction may be halted by neutralization of the reaction mixture. Alternately, the modifier may be first reacted with formaldehyde, then melamine is charged into the reaction mixture. Still another way of preparation is to charge melamine, formaldehyde and the modifier all together, maintain the pH in the order of from about 4.5 to about 6.5 and then carry the polymerization out to the desired end. The end point of the polymerization has been found best determined by viscosity measurement of the resin syrup. At 35% resin solids, a minimum viscosity of 20 centipoises measured at 25° C. must be reached before the reaction is stopped. There is no upper viscosity limit to which the resin should be polymerized, but for practical purposes a viscosity at 25° C. significantly above 800 centipoises at 35% solids has been found to unduly shorten the storage life of the resin. The preferred viscosity range of the finished syrup measured at 25° C. and at 35% solids is from about 30 to about 500 centipoises. It was further disclosed in the parent application that the reactants may be added in portions at different points of reaction; for example, a part of formaldehyde may be first reacted with melamine, the modifier charged, and the remaining formaldehyde added after the reaction mass has been highly polymerized.

We have now found that certain distinctive advantages are obtained when the polyfunctional aliphatic polyamine condensation product is added to the reaction product of melamine-formaldehyde when the latter is only partially polymerized. In the reaction of melamine with formaldehyde, the tendency where there is present an excess of formaldehyde unless the reaction is carefully controlled, is to form intermediate polymethylol melamines. These polymethylol derivatives though completely soluble in 0° C. water immediately after their formation, tend to crystallize out rapidly even at elevated temperature. The disadvantage of this crystallization is that it seriously interferes with the reaction, and to a substantial degree, minimizes the yield of the soluble condensation polymerization product. By adding the polyfunctional aliphatic polyamine condensation product to the melamine-formaldehyde syrup at a stage when less than the theoretical maximum amount of 6 moles of formaldehyde per mole of melamine is present and when only partial polymerization has been permitted to take place, these consequences may be avoided.

The partially polymerized melamine-formaldehyde syrup which is treated with a polyfunctional aliphatic polyamine condensation product according to the practice of the present invention, may be obtained commercially; or it may be prepared, as hereinafter more fully described, by reacting less than the theoretical maximum molar combining ratio of formaldehyde with melamine of 6:1, respectively.

It is, accordingly, an object of the present invention to provide an improved method for making a cationic water-soluble resinous material by reacting a partially polymerized melamine-formaldehyde resin with a polyfunctional aliphatic polyamine condensation product. It is a further object of the present invention to provide a method of making a water-soluble melamine-formaldehyde resinous material by reacting a polyfunctional aliphatic polyamine condensation product and formaldehyde, with a partially polymerized melamine-formaldehyde resin obtained by reacting melamine with less than the maximum theoretical molar ratio of 6 moles of formaldehyde per mole of melamine until a point is reached where the material has reacted beyond the methylol state, but not beyond a point just short of the gel stage. These and other objects of our invention will be discussed more fully hereinbelow.

Melamine reacts readily with formaldehyde in neutral aqueous solutions in all molar proportions between 1:1 to 1:6 melamine to formaldehyde, respectively. In the cold, methylol condensation products form by prolonged action; these methylol compounds at suitable concentration may separate from the solution in crystalline form. At higher temperatures, the methylol compounds are formed in a shorter time; for example boiling for some minutes and cooling to separate the compound. By the further action of heat, further condensation occurs with rapid formation of hydrophilic and then hydrophobic resins. By still further heating, there is finally formed the gummy phase, followed by hardening to an insoluble polymerization product. Correspondingly, with the desired condensation product the reaction may be interrupted at any phase of the condensation and the product separated in a known manner as by filtration, evaporation, precipitation, decantation, drying (spray or otherwise), or the like.

It has been found that reactions between melamine and formaldehyde can be very conveniently and advantageously carried out without the disadvantages of insoluble formation, etc., discussed above by a first stage reaction of melamine and formaldehyde in a ratio of 1:1.5 to 1:5, preferably 1:2 to 1:4, to form a partially polymerized melamine-formaldehyde condensation product, carrying the reaction to a point beyond the methylol stage but short of the gel stage, i. e., not beyond the 60° C. hydrophobe point as hereinafter more fully described, and thereafter adding a polyfunctional aliphatic polyamine condensation product and additional amounts of formaldehyde in a second stage reaction.

The methylol stage will be understood as that point in the reaction between melamine and formaldehyde prior to polymerization where monomeric methylol melamines only are present, i. e., melamines containing from 1-6 methylol (—CH2OH) groups.

The stage of partial polymerization will be understood as that stage, before the gel point is reached, where there are present both monomeric and polymerized methylol melamines and where the reacting material is soluble when diluted with aqueous formaldehyde. The resinous reacting syrup has the proper characteristics when it is polymerized in part but not beyond the point where one part by volume of the syrup is insoluble, or forms a precipitate, with an equal volume of 37% aqueous formaldehyde at 60° C. i. e., the partially polymerized range of the instant invention is that within which the reacting syrup is beyond the methylol stage and is hydrophilic with an equal part of 37% aqueous formaldehyde at a temperature of 60° C. or lower but not beyond the point where the syrup is hydrophobic at 60° C. or above.

It will be understood that "hydrophobic" or "hydrophobe" as herein employed refers to that property of the syrup where it begins to become insoluble in water. Zero-degree hydrophobe specifies the condition of the resin when it exhibits this hydrophobe property in water of 0° C. The hydrophobe stage is readily apparent by the formation of a white precipitate when a portion of the resinous reacting composition is placed into water.

The gel point will be understood as that stage in condensation where complete miscibility of the polymerized material with aqueous formaldehyde in ordinarily commercially available strengths of approximately 37% concentration and 60° C. would not as a practical matter be possible due to the advanced polymerization of the reacted mass. The extent of this partial polymerization may be easily detected by testing the solubility of the resin in water of varying temperatures. Generally, although not necessarily, it is tested at a temperature lower than the melamine-formaldehyde reacting mixture. We have found it preferable to test for hydrophobe in 0° C. water, although testing even at lower temperatures, as in salt solutions, is possible in ascertaining the point when some of the methylol melamines begin to polymerize.

After partially polymerized material is ascertained as being in this condition, i. e., beyond the methylol stage but not beyond the 60° C. hydrophobe point, the polyamine and more formaldehyde are introduced in a second stage and further polymerization is carried out at an acidic, pH, or at high temperatures or both to the desired viscosity. The rate of addition of the subsequent portion of formaldehyde is not critical, it being only necessary that between 6 and 14 mols of formaldehyde per mol of melamine be present prior to the end point of the reaction.

The addition of greater amounts than 14 mols of formaldehyde at this stage has been found to slow down proportionately the condensation-polymerization reaction with much the same effect that occurs when neutralizing the reacting mixture with sodium hydroxide. Under ordinary operating conditions, a ratio of more than 14 mols of formaldehyde per mol of melamine will generally retard the reaction rate to a point where polymerization at greater concentration is not advisable. Accordingly, the formaldehyde to melamine ratio in the composition is generally not permitted to exceed 14:1 respectively, during this second stage prior to the end point of the polymerization, i. e., the point where the viscosity of the reaction product measured at 35% solids and 25° C. falls within the range of about 20-800 centipoises.

The polymerization of the partially polymerized melamine-formaldehyde resin may be performed in the presence of a part or all of the polyalkylene polyamine condensation product. Generally, the lower the pH of the reaction mixture, the faster is the rate of reaction. We have found that the reaction during the first stage can be carried out at a pH range from about 1 to about 11, with the preferred range being from 6 to 10. The most suitable pH, however, depends on the particular modifying compositions used. Generally, because of the retarding effect with a greater amount of formaldehyde, a lower pH should be used proportionately with increased amounts of formaldehyde. With the polyfunctional aliphatic polyamine condensation product in the reacting mass, a lower pH may be used.

When the reaction is carried out in the second stage at a ratio of 6 mols or less of formaldehyde per mol of melamine, the reaction will proceed very rapidly; and control of the polymerization reaction will be difficult. It is desirable, therefore, to keep the molar ratio of formaldehyde to melamine above 6 but below 14 during the polymerization at acidic pH. As soon as the end point is reached, as determined by viscosity measurements, the polymerization reaction can be terminated either by cooling or by neutralizing to a pH of about 7, as with sodium hydroxide, amines, etc., and/or by diluting with water and formaldehyde. Neutralization of the composition is preferably employed to stop further polymerization at the end point.

Temperature of reaction may be in the range from room temperature to the reflux temperature of the mix. If an autoclave is used in carrying out the reaction, even higher temperatures may be employed. The preferred temperature range is from about 20° C. to about 100° C. at atmospheric pressure. After the end point in the polymerization, additional amounts of formaldehyde (providing at least 8 mols per mol of melamine are present) limited only by practical considerations, but preferably between 8 and 30 mols per mol of melamine may be added in a third stage either before, during, or after the neutralization step. This final portion of formaldehyde is utilized to lend greater stability to the resinous composition.

In order that the present invention may be more fully understood, the following examples are set forth for purposes of illustration only, and any specific enumeration of details should not be interpreted as a limitation except as expressed in the appended claims. All parts used are parts by weight.

*Example 1*

Melamine, in an amount of 126 parts (1 mole) is reacted in a suitable reaction vessel with 283 parts of 37% aqueous solution of formaldehyde (molar ratio 1:3.5 respectively) at a neutral pH until a drop of the reaction mass begins to precipitate or hydrophobe in 0° C. water; a sample tested at this stage with an equal portion of 37% aqueous formaldehyde at 60° C. is completely soluble. A second portion of 37% formaldehyde in an amount of 688.5 parts (providing molar ratio 1:8.5 respectively) is immediately added. The above resin is further reacted with 88 parts of a 33% aqueous solution of a condensation product of ethylene dichloride and 3,3′-iminobispropylamine, (molar ratio ethylene dichloride to 3,3′-iminobispropylamine 0.85:1) the preparation of which has been disclosed in our copending application Serial No. 445,169, filed July 22, 1954. These materials are allowed to react at a pH of 4 until the viscosity of the resin syrup reaches "I" on Gardner-Holdt scale at 25° C. and the reacting mixture is then neutralized with sodium hydroxide. The resin is miscible with water in all proportions. In treating bleached kraft pulp by beater addition, the resin greatly improves both the dry and the wet strength of the paper.

Example 2

The experiment of Example I is repeated, except that 102 parts of a 38% aqueous solution of a condensation product of tetraethylenepentamine and epichlorohydrin (molar ratio tetraethylenepentamine to epichlorohydrin 1:1.5 is used as modifier instead of the ethylenedichloride-3,3′-iminobispropylamine condensation product of Example 1.) When the viscosity of the system reaches "U" on the Gardner-Holdt scale, the resin is neutralized to pH 7 with a 2% aqueous solution of sodium hydroxide. The finished resin has similar properties as the above resin. It also exhibits marked improvement on the wet and dry strength characteristics of paper when employed for this purpose.

Example 3

126 parts of melamine and 202 parts of formalin (37% aqueous formaldehyde) (mole ratio of 2.5) are reacted in a suitable reaction vessel at pH 6.5 until the reaction mass exhibits hydrophobe when a portion is placed in water at 0° C. A sample taken at this stage and diluted with an equal volume of 37% aqueous formaldehyde is completely soluble at 60° C. A second portion of 37% formaldehyde, 690 parts (providing a total molar ratio of formaldehyde to melamine of approximately 11) is immediately added together with 51 parts of a 40% ammonia-epichlorohydrin condensation product. The pH is lowered to pH 3 with dilute hydrochloric acid and the reaction continued until the viscosity measured at 25° C. reaches "Y" on the Gardner-Holdt scale. Further reaction is stopped by adjusting the pH to about 7 with a small amount of triethylenetetramine. The product is stable, water soluble and imparts good strength characteristics when used in paper.

Example 4

189 parts melamine and 486 parts of a 37% aqueous solution of formaldehyde approximate molar ratio formaldehyde to melamine of 4:1, respectively, are reacted at pH 11 until a sample of the reaction mass exhibits hydrophobe when tested in 0° C. water; a portion diluted with an equal volume of 37% aqueous formaldehyde at 60° C. is completely soluble. A second portion of 37% aqueous formaldehyde (729 parts) providing a total moral proportion of melamine to formaldehyde of approximately 1:10 respectively was added during this second reaction stage and 160 parts of a 39% solution of triethylenetetramineepichlorohydrin condensation product molar ratio 1:1.5 is immediately added and the pH adjusted to 4.2 with hydrochloric acid. The reaction is continued until a viscosity of "E" on the Gardner-Holdt scale at 25° C. is reached and the reaction halted by adding dilute sodium hydroxide until a pH of 7 is reached. To this neutralized syrup 1072 parts of a 37% aqueous solution of formaldehyde is added providing a final total of 18 moles of formaldehyde per mole of melamine. The product is stable and water soluble.

Example 5

126 parts of melamine and 365 parts of 37% aqueous formaldehyde (molar ratio of approximately 1:4.5 respectively) are reacted in a suitable reaction vessel at a pH of 7 at a temperature of about 70° C. until a sample of the reactant syrup exhibits hydrophobe when tested in 0° C. water; a portion diluted with an equal volume of 37% aqueous formaldehyde is completely soluble at 60° C. 250 parts of a 40% aqueous solution of the condensation product of ammonia and glycerin-dichlorohydrin and 730 parts of 37% formaldehyde are then immediately charged (providing a melamine to formaldehyde molar ratio of 1:13.5 respectively) the pH adjusted to 4.5 and the reaction allowed to proceed until a viscosity of "P" on the Gardner-Holdt scale is reached at 25° C., when the reaction was stopped by neutralizing the resinous syrup with sodium hydroxide solution. The product is water soluble and stable.

Example 6

A mixture of 63 parts of melamine (0.5 mol) and 142 parts of 37% aqueous formaldehyde (1.75 mol) having a slurry pH adjusted to 7.5 with barium hydroxide is heated at 90° C. until the condensation product begins to hydrophobe in a 30% aqueous potassium chloride solution at 0° C. When a sample of the condensation product at this stage is tested with an equal volume of 37% aqueous formaldehyde at 60° C., it is completely soluble. A second portion of 37% aqueous formaldehyde in an amount of 344 parts (4.25 mols) is immediately added, followed by 50 parts of a 33% aqueous solution of a condensation product of ethylene dichloride and 3.3′-iminobispropylamine (molar ratio 0.80 to 1.00). A sufficient amount of hydrochloric acid is added to adjust the pH to 5.5. Polymerization proceeds smoothly at 65° C.; after 1½ hours a Gardner-Holdt viscosity of "E" is reached. The polymerization reaction is terminated by adjusting the pH of 7.4 with a small amount of triethanolamine. The resin is further diluted with 486 parts of 37% aqueous formaldehyde, providing a final total of 24 moles of formaldehyde per mole of melamine.

As has been stated, in practicing the process of our invention after the polymerization has progressed just beyond the methylol stage, it is necessary that additional amounts of formaldehyde be added to the reaction mixture until a total molar ratio of formaldehyde to melamine is more than 6:1 but less than 14:1, respectively. The polyfunctional polyamine condensation product is added and polymerization then allowed to proceed to the desired degree; then, more formaldehyde may be added to stabilize the resin after the end point. It will be understood that where there is already present 8 mols or more of formaldehyde before the end point, i. e., during the second stage, it may be advantageous and desirable to increase the formaldehyde content; but this is not essential providing there is present at least 8 moles of formaldehyde per mol of melamine in the final reaction product. No fixed maximum ratio of formaldehyde need be set, although a practical upper limit will necessarily be reached. As heretofore stated, it is preferable that a total amount of from at least 8 mols of formaldehyde per mol of melamine to about 30 mols of formaldehyde per mol of melamine be employed in the preparation of the resinous product.

We have found that the resin of the present invention has superior properties and good stability when it has a total formaldehyde content of at least 8 mols and preferably lies in the range of 8–30 mols of formaldehyde per mol of melamine.

It will be apparent that the partially polymerized condensation product used in making the water-soluble melamine-formaldehyde resinous compositions with polyalkylene-polyamine condensation product may be either prepared to the partially polymerized state as herein described, or it is, of course, possible to apply the teaching of the instant invention to a material in the partially polymerized state which have been obtained commercially. It is only necessary that the melamine-formaldehyde ratio of the partially polymerized condensation product be within the range of 1:1.5 to 1:5 and that the material satisfy the requirement that it be reacted beyond the methylol stage but just short of the gel point, as heretofore defined.

The polyfunctional aliphatic polyamine condensation products utilized in the production of the resinous compositions of the present invention are those obtained by reacting compounds selected from the group consisting of difunctional halohydrin and ammonia; difunctional halohydrin and polyalkylene polyamine; and dihaloalkane and polyalkylene polyamine. The polyfunctional polyamine condensation products are obtained as set forth in the following illustrative examples. All parts employed are parts by weight and should not be considered critical unless otherwise noted in the appended claims.

Example 7

An ammonia epichlorohydrin condensation product is prepared as follows:

533 parts of aqueous ammonia solution (27% $NH_3$) is charged into a suitable reaction vessel. 277 parts of epichlorohydrin is added gradually thereto. The exothermic reaction is controlled at 26–29° C. Thereafter the mixture is heated on a steam bath for 1 to 2 hours. The reaction product is then cooled to about 15–20° C. and 240 parts of a 50% solution of sodium hydroxide is added and allowed to stand for 15 minutes. The reaction mixture is then diluted to about 40% solids content by the addition of the required amount of water.

Difunctional halohydrin polyalkylene polyamine condensation products may be prepared as set forth in Examples 7 and 8.

Example 8

1701 parts of tetraethylene pentamine is dissolved in 1800 parts of water in a suitable vessel with stirring. Heat is liberated and the solution cooled to 20° C. 1832.5 parts of epichlorohydrin are slowly added to this cool solution over a period of 1½ hours during which time the reaction vessel is intermittently cooled in order to prevent the temperature from rising above 30° C. After the addition is complete, the reaction mixture is allowed to heat spontaneously and the temperature rises to a maximum of about 49° C. at the end of 2 hours. After an additional 1½ hours, the temperature falls to 43° C. and the solution is then heated with steam for 4 hours at 95–96° C. Upon cooling, the product is a light red, clear, viscous syrup.

Example 9

25 parts of water are added to 47 parts of tetraethylenepentamine and the mixture is cooled to about 3° C. 80 parts of glycerol alpha-dichlorohydrin are added dropwise over a period of 2 hours and the mixture is then allowed to warm up to room temperature over the next hour. This represents a mole ratio of about 1 to 2.9 of polyamine to halohydrin. The mixture is then heated over a steam bath gradually to 92° C. for ½ hour. The resinous mixture is then chilled to about 6° C. 12 parts of a 97% sodium hydroxide solution in water and 36 parts of water are added to the resinous mixture which is kept chilled on a cooling bath for an additional ½ hour. The cooling bath is then removed. The resin is then diluted to about 15% solids by the addition of water. This condensation product solution is now comparatively stable and can be further diluted as desired.

Example 10

A dihaloalkane polyalkylene polyamine condensation product is prepared as follows:

284 parts of tetraethylene pentamine was placed in a suitable reaction vessel provided with heating means and an agitator. The tetraethylene pentamine is heated to about 85° C. while 202 parts of trimethylene dibromide are added slowly while maintaining the temperature at about 85 to 90° C. After all of the trimethylene dibromide is added, the resulting viscous syrup is heated for about ½ hour more. The syrup is dissolved in 1,000 parts of water and then cooled to about 5° C. 40 parts of sodium hydroxide dissolved in 100 parts of water is then added in order to form the free base of the condensation product.

In the preparation of the condensation products set forth in Examples 7, 8, 9, and 10 above, the amounts of difunctional halohydrin or dihaloalkane reacted with ammonia or polyalkylene polyamine may vary in molar ratio of from 1:3 to 3:1 respectively. The temperature of reaction maintained throughout the condensation reaction may vary from 0° C. to the reflux temperature of the mixture with the preferred temperature range being from room temperature to reflux temperature.

By the use of the term difunctional halohydrin we include the epihalohydrins and the dihalohydrins. Among the epihalohydrins which can be utilized with the polyalkylene polyamines or ammonia to form the reaction product for use in the process of our invention, we include epichlorohydrin, epibromohydrin, epiiodohydrin and epifluorohydrin. The difunctional dihalohydrins that may be utilized include such compounds as glycerol-α-dichlorohydrin, glycerol-β-dichlorohydrin, glycerol-α-dibromohydrin, glycerol-β-dibromohydrin, and the like.

The difunctional halohydrins which are used in the preparation of these condensation products are the derivatives of glycerol, in which at least one hydroxy group, preferably a terminal hydroxy group, has been substituted by a halogen atom, such as by the substitution of chlorine, iodine, bromine and fluorine. In the instance of a monohalohydrin substitution, it is necessary that the remaining 2 hydroxy groups be dehydrated to form an epoxy linkage.

The dihaloalkanes that may be utilized in our invention include ethylene dichloride, trimethylene dichloride, trimethylene dibromide, ethylene dibromide, trimethylene diiodide and the like. The polyalkylene polyamines which may be employed in the production of the condensation products with the dihaloalkanes or the difunctional halohydrins are such compounds as ethylene diamine, diethylene triamine, triethylene tetramine, tetraethylene pentamine, 3,3' - iminobispropylamine, tris - (3 - aminopropyl)amine, 1,4-diaminobutane 3,3' methyl iminobispropylamine, N-(3 hydroxypropyl)-aminopropylamine, N-(2 hydroxyethyl)-amino-propylamine and the like.

The amount of polyfunctional aliphatic polyamine condensation product that may be employed in the preparation of the resinous material may vary over rather wide limits. The amount of the condensation product utilized is based on the number of atoms of basic nitrogen present in said product. From about 0.3 atom of basic nitrogen present in the polyfunctional aliphatic polyamine condensation product per mole of melamine to about 10 atoms of basic nitrogen present in the polyfunctional aliphatic polyamine condensation product per mole of melamine may be used. It is preferred, however, that from about 0.5 atom basic nitrogen to about 4 atoms basic nitrogen present in the polyfunctional aliphatic polyamine condensation product be utilized per mole of melamine present. The particular polyfunctional aliphatic polyamine condensation product should be so selected that the carbon to nitrogen ratio present is not greater than 4:1. We have found that a carbon to nitrogen ratio greater than this is detrimental to the water solubility of the resinous product.

Three of the resins prepared as set forth above were tested as wet strength paper resins. Hand sheets were made on a Nash Paper Handsheet machine with Canadian bleached kraft pulp beaten to a green freeness of about 500. The solids content of the syrup is determined by the Plastic Materials Manufacturers Association method. The amount of resin applied in resin solids per 100 parts of dry pulp is as shown in Table I. The pH of the pulp slurry is adjusted to 4.5. After the hand sheets are made, they are dried at 220–240° F. for two minutes. The test results are set forth in the table below.

TABLE I

| Resin Described in— | Percent Resin Applied | Dry Tensile, lbs./in. | Wet Tensile, lbs./in. |
| --- | --- | --- | --- |
| Ex. 1 | 1 | 31.8 | 6.1 |
| Ex. 2 | 1 | 31.1 | 5.6 |
| Ex. 3 | 2 | 32.6 | 7.9 |
| Ex. 4 | 3 | 33.2 | 9.7 |
| Ex. 5 | 4 | 34.3 | 11.3 |
| Blank | None | 24.6 | 0.5 |

This is a continuation-in-part of our copending application Serial No. 343,792, filed March 20, 1953.

Attention is directed to our copending application Serial No. 520,358, filed concurrently herewith, covering resinous compositions and process of preparing by reacting melamine, formaldehyde and a polyfunctional aliphatic polyamine.

What we claim is:

1. The process of preparing a water soluble resinous composition comprising the reaction product of melamine, formaldehyde and a polyfunctional aliphatic polyamine condensation product selected from the group consisting of (1) ammonia and a difunctional halohydrin, (2) a polyalkylene polyamine and a difunctional halohydrin and (3) a polyalkylene polyamine and a dihaloalkane wherein the formaldehyde is present in a total amount of at least 8 moles per mole of melamine which comprises reacting a partially polymerized melamine-formaldehyde condensation product having a melamine to formaldehyde mole ratio of from about 1:1.5 to 1:5 respectively, which has been reacted to a point beyond the methylol stage, but short of the gel stage, at a temperature of between about 20° C. and 100° C. with a polyfunctional aliphatic polyamine condensation product providing a carbon to nitrogen ratio not greater than 4:1 respectively, in an amount sufficient to yield between about 0.3 and 10 atoms of nitrogen per mole of melamine; introducing additional amounts of formaldehyde until there is present a mole ratio of melamine to formaldehyde within the range of 1:6 to about 1:14 respectively, continuing the reaction until a viscosity of about 20 centipoises and 800 centipoises measured at 35% solids and 25° C. is obtained; inhibiting further reaction by substantially neutralizing the reaction product, and adding thereto formaldehyde in an amount sufficient to bring the mole ratio of the melamine to total formaldehyde charged to at least 1:8 respectively.

2. The process of preparing a water soluble resinous composition comprising the reaction product of melamine, formaldehyde and a polyfunctional aliphatic polyamine condensation product selected from the group consisting of (1) ammonia and a difunctional halohydrin, (2) a polyalkylene polyamine and a difunctional halohydrin and (3) a polyalkylene polyamine and a dihaloalkane wherein the formaldehyde is present in a total amount of between about 8 moles and about 30 moles per mole of melamine which comprises reacting a partially polymerized melamine-formaldehyde condensation product having a melamine to formaldehyde mole ratio of from about 1:2 to 1:4 which has been reacted to a point beyond the methylol stage but short of the gel stage at a temperature of between about 20° C. and 100° C. with a polyfunctional aliphatic polyamine condensation product providing a carbon to nitrogen ratio not greater than 4:1, respectively, in an amount sufficient to yield between about 0.5 and 4 atoms of nitrogen per mole of melamine; introducing additional amounts of formaldehyde until there is present a mole ratio of melamine to formaldehyde within the range of from 1:6 to 1:14, respectively; continuing the reaction until a viscosity of between about 20 centipoises and 800 centipoises measured at 35% solids and 25° C. is obtained; inhibiting further reaction by substantially neutralizing the reaction product, and adding thereto additional formaldehyde in an amount sufficient to bring the mole ratio of the melamine to total formaldehyde charged to at least 1:8 respectively.

3. The process of preparing a water soluble resinous composition comprising the reaction product of melamine, formaldehyde and a polyalkylene polyamine and dihaloalkane condensation product wherein the formaldehyde is present in a total amount of at least 8 moles per mole of melamine which comprises making a partially polymerized melamine-formaldehyde condensation product by reacting melamine and formaldehyde in the ratio of 1:1.5 to 1:5 at a temperature of between about 20° C. and 100° C. to a point beyond the methylol stage but short of the gel stage; thereafter adding a polyalkylene polyamine and dihaloalkane condensation product which has a carbon to nitrogen ratio not greater than 4:1 respectively in an amount sufficient to yield between about 0.3–10 atoms of nitrogen per mole of melamine; introducing additional amounts of formaldehyde until the mole ratio of melamine to formaldehyde lies within the range of 1:6 to 1:14, respectively; continuing the reaction until a viscosity of between about 20 centipoises and 800 centipoises measured at 35% solids and 25° C. is obtained; inhibiting further reaction by substantially neutralizing the reaction product, and adding thereto formaldehyde in an amount sufficient to bring the mole ratio of the melamine to total formaldehyde charged to at least 1:8 respectively.

4. The process of preparing a water-soluble resinous composition comprising the reaction product of melamine, formaldehyde and a polyalkylene polyamine and difunctional halohydrin condensation product wherein the formaldehyde is present in a total amount of at least 8 moles per mole of melamine which comprises making a partially polymerized melamine-formaldehyde condensation product by reacting melamine and formaldehyde in the ratio of 1:1.5 to 1:5 at a temperature of between about 20° C. and 100° C. to a point beyond the methylol stage but short of the gel stage; thereafter adding a polyalkylene polyamine and difunctional halohydrin condensation product which has a carbon to nitrogen ratio not greater than 4:1 respectively in an amount sufficient to yield between about 0.3–10 atoms of nitrogen per mole of melamine; introducing additional amounts of formaldehyde until the mole ratio of melamine to formaldehyde lies within the range of 1:6 to 1:14 respectively; continuing the reaction until a viscosity of between about 20 centipoises and 800 centipoises measured at 35% solids and 25° C. is obtained; inhibiting further reaction by substantially neutralizing the reaction product, and adding thereto formaldehyde in an amount sufficient to bring the mole ratio of the melamine to total formaldehyde charged to at least 1:8 respectively.

5. The process of preparing a water soluble resinous composition comprising the reaction product of melamine, formaldehyde and ammonia and a difunctional halohydrin condensation product wherein the formaldehyde is present in a total amount of at least 8 moles per mole of melamine which comprises making a partially polymerized melamine-formaldehyde condensation product by reacting melamine and formaldehyde in the ratio of 1:1.5 to 1:5 at a temperature of between about 20° C. and 100° C.

to a point beyond the methylol stage but short of the gel stage; thereafter adding an ammonia difunctional halohydrin condensation product which has a carbon to nitrogen ratio not greater than 4:1 respectively in an amount sufficient to yield between about 0.3–10 atoms of nitrogen per mole of melamine; introducing additional amounts of formaldehyde until the mole ratio of melamine to formaldehyde lies within the range of from 1:6 to 1:14 respectively; continuing the reaction until a viscosity of between about 20 centipoises and 800 centipoises measured at 35% solids and 25° C. is obtained; inhibiting further reaction by substantially neutralizing the reaction product, and adding thereto formaldehyde in an amount sufficient to bring the mole ratio of the melamine to total formaldehyde charged to at least 1:8 respectively.

6. The process of preparing a water soluble resinous material comprising the reaction product of melamine, formaldehyde and a polyalkylene polyamine and dihaloalkane condensation product wherein the formaldehyde is present in a total amount of between 8 and 30 moles per mole of melamine which comprises making a partially polymerized melamine-formaldehyde condensation product by reacting melamine and formaldehyde in a ratio of 1:2 to 1:4 at a temperature of between about 20°C. and 100°C. to a point beyond the methylol stage, but short of the gel stage; thereafter adding a polyalkylene polyamine and dihaloalkane condensation product which has a carbon to nitrogen ratio not greater than 4:1 respectively in an amount sufficient to yield between about 0.5–4 atoms of nitrogen per mole of melamine; introducing additional amounts of formaldehyde until the mole ratio of melamine to formaldehyde lies within the range of 1:6 to 1:14 respectively; continuing the reaction until a viscosity of between about 20 centipoises and 800 centipoises measured at 35% solids and 25°C. is obtained, inhibiting further polymerization by substantially neutralizing the reaction product, and adding thereto formaldehyde in an amount sufficient to bring the mole ratio of the melamine to total formaldehyde charged to at least 1:8 respectively.

7. The process of preparing a water soluble resinous material comprising the reaction product of melamine, formaldehyde and a condensation product of 3,3'-iminobispropylamine and ethylene dichloride wherein the formaldehyde is present in a total amount of at least 8 moles per mole of melamine which comprises making a partially polymerized melamine-formaldehyde condensation product by reacting melamine and formaldehyde in a ratio of 1:1.5 to 1:5 at a temperature of between about 20° C. and 100° C. to a point beyond the methylol stage but short of the gel stage; thereafter adding the 3,3'-iminobispropylamine and ethylene dichloride condensation product in an amount sufficient to yield between about 0.3–10 atoms of nitrogen per mole of melamine; introducing additional amounts of formaldehyde until the mole ratio of melamine to formaldehyde lies within the range of 1:6 to 1:14 respectively; continuing the reaction until a viscosity of between about 20 centipoises and 800 centipoises measured at 35% solids and 25° C. is obtained; inhibiting further reaction by substantially neutralizing the reaction product, and adding thereto formaldehyde in an amount sufficient to bring the mole ratio of the melamine to total formaldehyde charged to at least 1:8 respectively.

8. The process of preparing a water-soluble resinous material comprising the reaction product of melamine, formaldehyde and a condensation product of triethylenetetramine and epichlorohydrin wherein the formaldehyde is present in a total amount of at least 8 moles per mole of melamine which comprises making a partially polymerized melamine-formaldehyde condensation product by reacting melamine and formaldehyde in a ratio of 1:1.5 to 1:5 at a temperature of between about 20° C. and 100° C. to a point beyond the methylol stage but short of the gel stage; thereafter adding the triethylenetetramine and epichlorohydrin condensation product in an amount sufficient to yield between about 0.3–10 atoms of nitrogen per mole of melamine; introducing additional amounts of formaldehyde until the mole ratio of melamine to formaldehyde lies within the range of 1:6 to 1:14 respectively; continuing the reaction until a viscosity of between about 20 centipoises and 800 centipoises measured at 35% solids and 25° C. is obtained; inhibiting further reaction by substantially neutralizing the reaction product, and adding thereto formaldehyde in an amount sufficient to bring the mole ratio of the melamine to total formaldehyde charged to at least 1:8 respectively.

9. The process of preparing a water soluble resinous material comprising the reaction product of melamine, formaldehyde and a condensation product of ammonia and epichlorohydrin wherein the formaldehyde is present in a total amount of at least 8 moles per mole of melamine which comprises making a partially polymerized melamine-formaldehyde condensation product by reacting melamine and formaldehyde in a ratio of 1:1.5 to 1:5 at a temperature of between about 20° C. and 100° C. to a point beyond the methylol stage but short of the gel stage; thereafter adding the ammonia and epichlorohydrin condensation product in an amount sufficient to yield between about 0.3–10 atoms of nitrogen per mole of melamine; introducing additional amounts of formaldehyde until the mole ratio of melamine to formaldehyde lies within the range 1:6 to 1:14 respectively; continuing the reaction until a viscosity of between about 20 centipoises and 800 centipoises measured at 35% solids and 25° C. is obtained; inhibiting further reaction by substantially neutralizing the reaction product, and adding thereto formaldehyde in an amount sufficient to bring the mole ratio of the melamine to total formaldehyde charged to at least 1:8 respectively.

10. The process of preparing a water soluble resinous material comprising the reaction product of melamine, formaldehyde and a condensation product of tetraethylene pentamine and glycerol alphadichlorohydrin wherein the formaldehyde is present in a total amount of at least 8 moles per mole of melamine which comprises making a partially polymerized melamine-formaldehyde condensation product by reacting melamine and formaldehyde in a ratio of 1:1.5 to 1:5 at a temperature of between about 20° C. and 100° C. to a point beyond the methylol stage but short of the gel stage; thereafter adding the tetraethylene pentamine and glycerol alphadichlorohydrin condensation product in an amount sufficient to yield between about 0.3–10 atoms of nitrogen per mole of melamine; introducing additional amounts of formaldehyde until the mole ratio of melamine to formaldehyde lies within the range of 1:6 to 1:14, respectively, continuing the reaction until a viscosity of between about 20 centipoises and 800 centipoises measured at 35% solids and 25° C. is obtained; inhibiting further reaction by substantially neutralizing the reaction product, and adding thereto formaldehyde in an amount sufficient to bring the mole ratio of the melamine to total formaldehyde charged to at least 1:8 respectively.

11. The process of preparing a water soluble resinous material comprising the reaction product of melamine, formaldehyde and a condensation product of tetraethylene pentamine epichlorohydrin wherein the formaldehyde is present in a total amount of at least 8 moles per mole of melamine which comprises making a partially polymerized melamine-formaldehyde condensation product by reacting melamine and formaldehyde in a ratio of 1:1.5 to 1:5 at a temperature of between about 20° C. and 100° C. to a point beyond the methylol stage but short of the gel stage; thereafter adding the tetraethylene pentamine epichlorohydrin condensation product in an amount sufficient to yield between about 0.3–10 atoms of nitrogen per mole of melamine; introducing additional amounts of formaldehyde until the mole ratio of melamine to formaldehyde lies within the range of 1:6 to 1:14 respectively; continuing the reaction until a viscosity of between about 20 centipoises and 800 centipoises measured at 35% solids and 25° C. is obtained; inhibiting further reaction by substantially neutralizing the reaction product, and adding thereto formaldehyde in an amount sufficient to bring the mole ratio of the melamine to total formaldehyde charged to at least 1:8 respectively.

12. The process of preparing a water soluble resinous material comprising the reaction product of melamine, formaldehyde and a condensation product of 3,3'-iminobispropylamine and ethylene dichloride wherein the formaldehyde is present in a total amount of between 8 and 30 moles per mole of melamine which comprises making a partially polymerized melamine-formaldehyde condensation product by reacting melamine and formaldehyde in the ratio of 1:2 to 1:4 at a temperature of between about 20° C. and 100° C. to a point beyond the methylol stage but short of the gel point; thereafter adding the 3,3'-iminobispropylamine and ethylene dichloride condensation product in an amount sufficient to yield between about 0.5–4 atoms of nitrogen per mole of melamine; introducing additional amounts of formaldehyde until the mole ratio of melamine:formaldehyde lies within the range 1:6 to 1:14, respectively; continuing the reaction until a viscosity of between about 20 centipoises and 800 centipoises measured at 35% solids and 25° C. is obtained and inhibiting further reaction by substantially neutralizing the reaction product, and adding thereto formaldehyde in an amount sufficient to bring the mole ratio of the melamine to total formaldehyde charged to at least 1:8 respectively.

No references cited.